United States Patent Office.

CHARLES A. BUSH, OF NEW LONDON, ASSIGNOR FOR ONE-QUARTER OF HIS RIGHT TO HENRY P. OSTRUM, OF NEW HAVEN, CONNECTICUT.

Letters Patent No. 96,197, dated October 26, 1869.

IMPROVED MODE OF CLEANING GAS-RETORTS.

The Schedule referred to in these Letters Patent and making part of the same

I, CHARLES A. BUSH, of New London, county of New London, State of Connecticut, have invented and produced a new Method of Cleaning Gas-Retorts, of which the following is a specification.

The nature of my invention consists in adding salt and sulphur to limestone, oyster or other shells, for the purpose of cleaning gas-retorts.

To prepare the mixture, I take, say, one quart of salt and two ounces of sulphur. Mix thoroughly. Add water enough to dissolve one-half or two-thirds of the salt. Add the solution to one bushel of limestone, oyster, or other shells; putting three or four shovelfuls of the shells in the retort, leaving the door open. The gases arising from mixture cause the incrustation or calcined carbon to fall off, or be removed without injury to the brick, and, by occasional use of the mixture, obviate the necessity of stopping to clean retorts, thereby saving much time and expense.

Claim.

I claim the combination of salt and shells, and o salt, sulphur, and shells, for the purpose set forth.

Also, the combination of salt, sulphur, and limestone, for the purpose set forth.

CHAS. A. BUSH.

Witnesses:
PHILO P. BUSH,
W. S. HEADLEY.